UNITED STATES PATENT OFFICE.

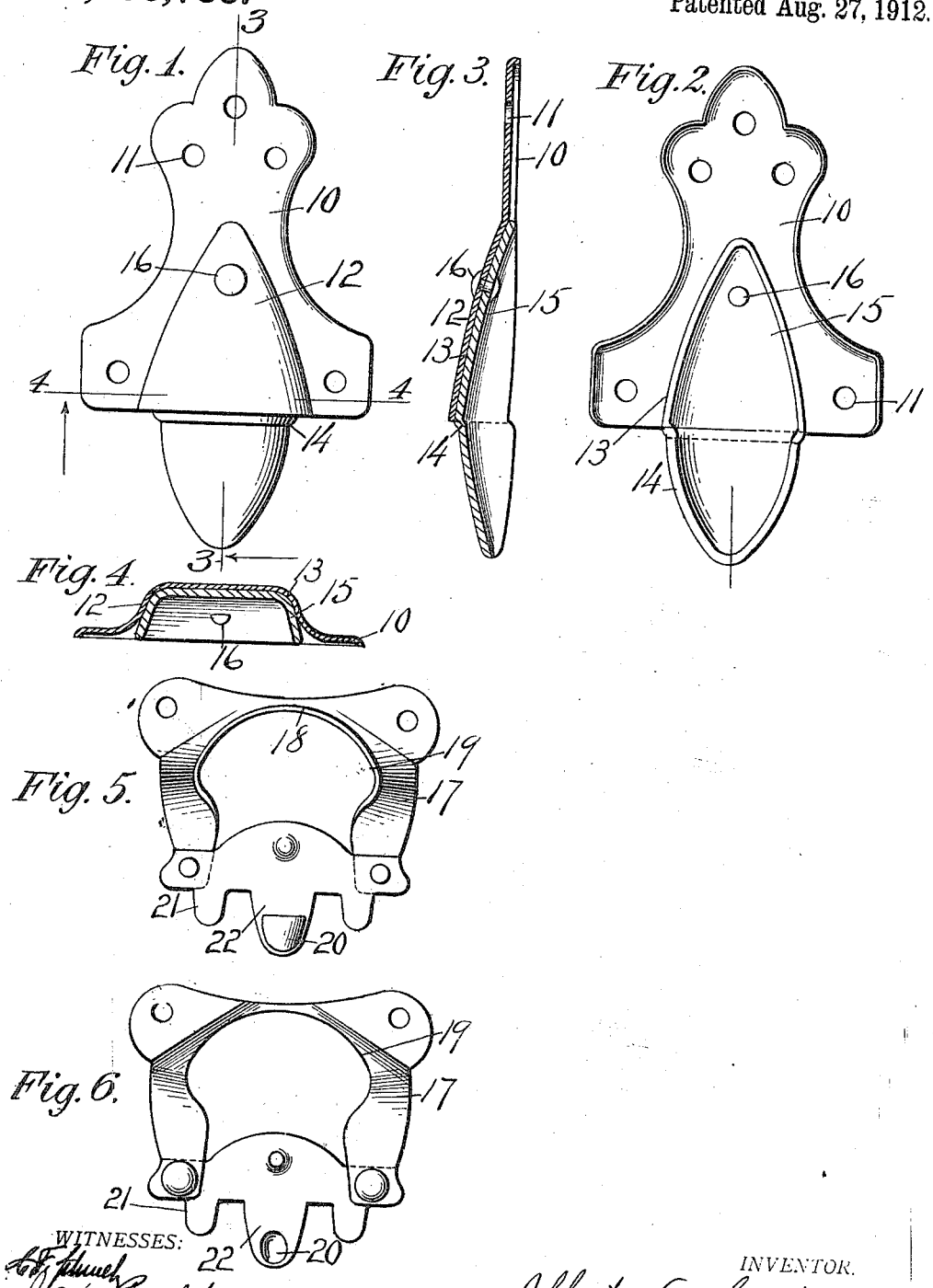

ALBERT L. SESSIONS, OF BRISTOL, CONNECTICUT.

TRUNK-FASTENER.

1,036,733.  Specification of Letters Patent.  Patented Aug. 27, 1912.

Application filed September 13, 1909. Serial No. 517,374.

*To all whom it may concern:*

Be it known that I, ALBERT L. SESSIONS, a citizen of the United States, and a resident of Bristol, in the county of Hartford and State of Connecticut, have invented a new and Improved Trunk-Fastener, of which the following is a specification.

My invention relates to the class of devices commonly employed to secure the lid or cover of a trunk, box or the like to the body part, and the object of the invention is to provide a device of this kind that while being extremely strong and efficient is neat in appearance and may be cheaply and economically made.

Forms of devices embodying my invention and in the use of which the objects above set out may be attained are illustrated in the accompanying drawings, in which—

Figure 1 is a face view of a dowel embodying my invention. Fig. 2 is a rear view of the same. Fig. 3 is a view in section on plane denoted by line 3—3 of Fig. 1. Fig. 4 is a view in cross-section on plane denoted by line 4—4 of Fig. 1. Figs. 5 and 6 are respectively face and rear views of a slightly different form of construction embodying my invention.

In the construction of hasp, dowel and like devices commonly employed for preventing lateral displacement of the lid or cover of a trunk, box or the like with respect to the body part, the structures are commonly formed in a single piece of cast metal, which construction necessitates that parts required to withstand little strain must be made unnecessarily heavy. The casting method is a common method of producing such structures which must be of considerable thickness at certain points to provide lugs, catches, etc. In the devices herein illustrated and described I have provided means whereby the parts composing the structures enumerated shall be of only the thickness required to withstand the strains which shall be exerted thereon, the parts being composed of different pieces of metal, one of which may be struck to shape from sheet metal and the other of which may be struck to shape from sheet metal or cast as may be desired.

In the accompanying drawings, referring to Figs. 1 to 4, the numeral 10 denotes a base plate which may be stamped or struck up from sheet metal in dies, this plate having the usual openings 11 for fastenings to secure it in place. This plate is swelled on the front face as at 12 forming a recess 13 on the back of the plate for the reception of the shank of a dowel pin 14 for securing the parts against lateral movement. This dowel pin or securing member in the form of construction herein shown, is also made from sheet metal of concavo-convex form, the shank 15 being formed to fit within the recess 13 and being secured against removal as by a rivet or like fastening 16. The shank fitting the recess prevents any lateral or longitudinal movement, while the rivet 16 prevents detachment. The opposite end is formed into a dowel 14 which is adapted to enter a socket-piece in the body part of the trunk, box or like device. In the preferred form of construction the base plate 10 is formed of sheet metal as brass and the dowel may be formed of sheet metal as steel or may be cast to shape, where extra weight and strength is required.

In the form of structure shown in Figs. 5, and 6, the base plate 17 is provided with the usual form of attachment to the trunk or like part and is flared out as at 18 to provide a hand-hold extending around the opening 19 in the plate. In this form of structure a lug 20 is provided for engagement of a hasp from the body of the trunk, and it is therefore a convenient form of construction to cast the part bearing this lug in order to provide the necessary thickness. For this purpose the dowel pins 21 and projection 22 bearing the lug 20 are formed in a single piece, preferably cast to shape, the plate 17 being stamped to form from sheet metal.

While I have shown and described herein certain structures embodying the invention, I contemplate structures of other form which will embody the invention, and I do not therefore limit myself to the exact construction herein shown and described.

The invention has been illustrated and described herein with reference to a trunk fastening as it finds ready application in such a structure, and it will be found to possess the same advantage in many different structures which on account of certain formations must be cast to shape, as it will enable such structures to be made by casting a portion of the structure only, the other part being formed of sheet metal.

I claim—

1. A fastening base plate composed of thin sheet metal, and a dowel formed of another piece of metal of substantially greater thickness than the base and rigidly secured thereto.

2. A base plate composed of one piece of metal and having a recess opening from its back surface, and a dowel of concavo-convex form extending into said recess rigidly secured therein and having a part projecting to form the dowel proper.

3. A base plate composed of sheet metal having on its back surface a concave recess tapering from its outer to its inner end, and a dowel formed of another and substantially thicker piece of metal with one end pointed and shaped to fit within said recess and secured therein and the other end pointed and shaped to provide a dowel.

ALBERT L. SESSIONS.

Witnesses:
EDWARD G. DUNBAR,
WILLIAM L. NEUBAUER.